Figure 1:
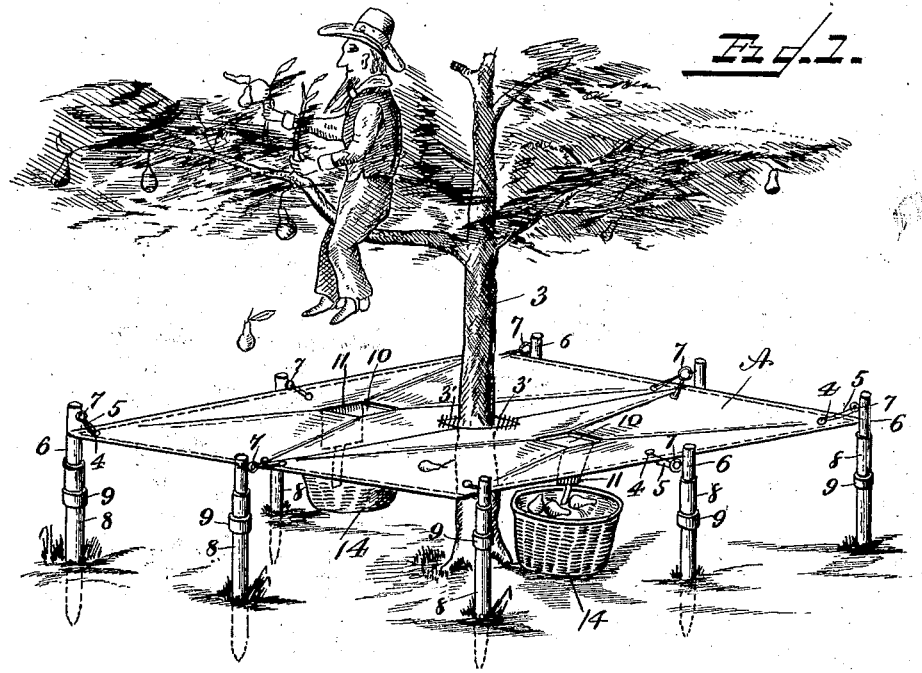

F. C. MOSIER.
FRUIT GATHERER.
APPLICATION FILED NOV. 18, 1907.

915,462.

Patented Mar. 16, 1909.

2 SHEETS—SHEET 1.

F. C. MOSIER.
FRUIT GATHERER.
APPLICATION FILED NOV. 18, 1907.
915,462.
Patented Mar. 16, 1909.
2 SHEETS—SHEET 2.
Fig. 2.
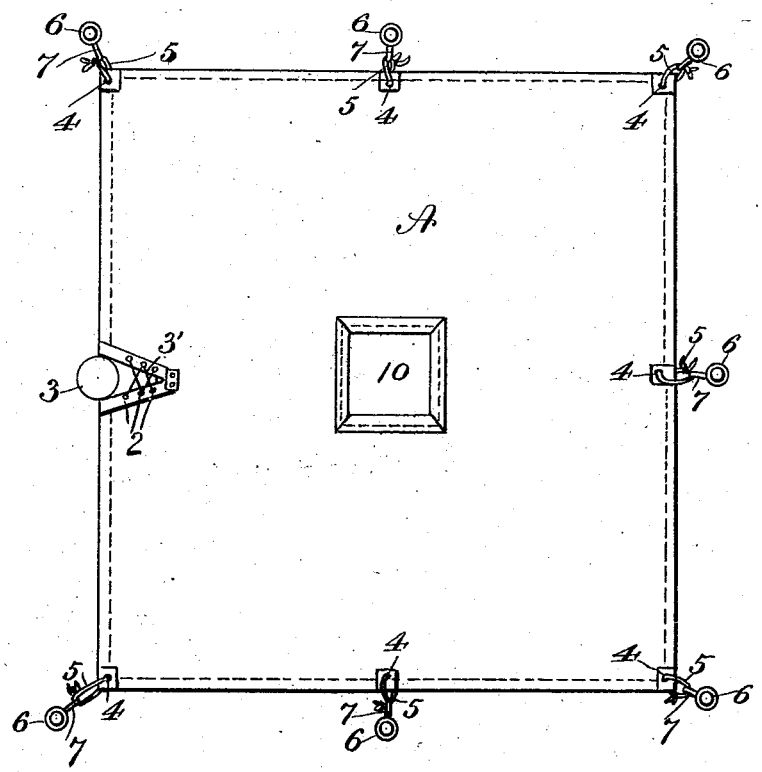
Fig. 3.
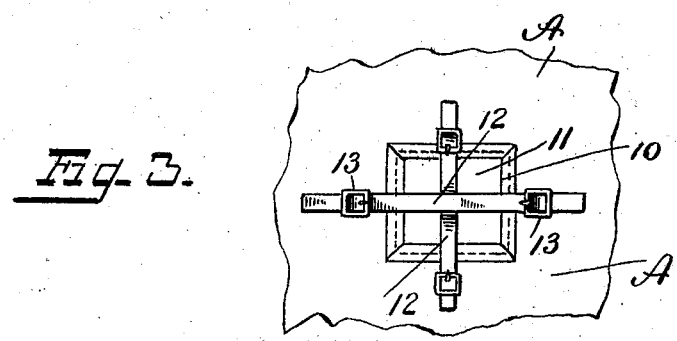
Witnesses
F. L. Ourand
M. K. Freeman
Inventor
Frank C. Mosier
By Louis Bagger
Attorneys

UNITED STATES PATENT OFFICE.

FRANK C. MOSIER, OF PITTSTON, PENNSYLVANIA.

FRUIT-GATHERER.

No. 915,462.          Specification of Letters Patent.          Patented March 16, 1909.

Application filed November 18, 1907. Serial No. 402,752.

*To all whom it may concern:*

Be it known that I, FRANK C. MOSIER, a citizen of the United States, residing at Pittston, in the county of Luzerne and State of Pennsylvania, have invented certain new and useful Improvements in Fruit-Gatherers, of which the following is a specification.

My invention relates to an improvement in means for gathering nuts and fruit falling or shaken from trees whereby to prevent the fruit from being injured by the fall, and also to facilitate the gathering of the nuts or fruit.

With this object in view my invention consists in a flexible device preferably made of some textile fabric, such as burlap, and adapted to be stretched out under the limbs of a tree and some distance above the ground whereon to receive the fruit or nuts, which may fall or be shaken from the limbs of the tree.

The invention further consists in means for letting the fruit or nuts drop therefrom in a basket or other receptacle by gravity after breaking the fall in order to facilitate gathering it in baskets or other receptacles.

The invention further consists in means for fastening the flexible device in place around the tree, and for closing up any openings therein when it is desired to do so.

My invention still further consists in certain novel features of construction and combinations of parts which will be hereinafter described and pointed out in the claims.

In the accompanying drawings Figure 1 is a view in perspective showing the appliance applied to the base of a pear tree; Fig. 2 is a plan view; Fig. 3 is a fragmentary view from below; Fig. 4 is a view of one of the sockets and pegs; and Fig. 5 is a section through the same showing a section of the flexible device attached thereto.

A represents the flexible device or net. This may be made of any form, preferably rectangular and of some textile fabric, such as burlap, with a hem formed about the edge to give it strength. In one edge there is a V shaped notch which is adapted to receive the trunk of the tree 3, as shown in Fig. 2, and this notch is provided with eyelets 2, 2 and a lace 3' as a convenient means for gathering it up and closing the hole left adjacent to the tree. Eyelets 4, 4 are formed at the corners and sides of the flexible device or net to receive cords 5, 5 whereby the device is supported upon the pegs 6, 6 by means of hooks or eyelets 7, 7, as the case may be. These pegs are adapted to be inserted in sockets 8, 8 which are pointed at their lower ends and adapted to be driven into the ground, they being provided with an enlarged band 9 to receive the blow of the hammer which drives them into the ground. Each flexible device or net is provided with an opening 10 at or near the center and this is covered by a flap 11 which may be held in place by means of strips 12, 12 and buckles 13.

When gathering fruit from a large tree two of these devices are generally used, as shown in Fig. 1, one on each side of the tree, and the flaps 11, 11 are left open, as shown, whereby the fruit after being caught and the fall being broken upon the flexible device or net, gravitates down through the openings 10 to the ground or preferably in a basket or other receptacle placed thereunder for the purpose, as shown at 14 in Fig. 1.

When nuts are gathered these flaps are usually closed and the lacing and notches are laced up close to the tree, as they are not injured by the fall, but many would be lost and difficult to get if they could fall through the flexible device or net, which is prevented by closing up the openings, as explained.

By the use of this device large quantities of fruit or nuts may be gathered in a very short space of time and without exercising the care ordinarily required to safe-guard them against being bruised or damaged, as the flexibility of the fabric is such that they are not injured by the fall into it, and by having the openings for the fruit to drop out in a basket or other receptacle much time is saved in gathering it from the net.

It is evident that slight changes might be resorted to in the form and arrangement of the several parts described without departing from the spirit and scope of my invention, and hence I do not wish to limit myself to the precise construction herein set forth. but:—

Having fully described my invention, what I claim as new and desire to secure by Letters Patent is:—

1. A fruit gatherer, comprising a flexible device or net made in two sections, each section having a notch therein, and means for closing the portions of the notches not occupied by the trunk of the tree.

2. A fruit gatherer comprising a flexible device having an opening for the trunk of a tree, means for supporting it at the edges, said flexible device having openings therein, flaps for closing said openings and means for fastening the flaps.

In testimony whereof I affix my signature in presence of two witnesses.

FRANK C. MOSIER.

Witnesses:
  BAYARD HAND,
  THOMAS ENGLISH.